Aug. 20, 1929.                J. H. WRIGHT                1,724,986
                       PORTABLE PLANT DUSTING MACHINE
                   Filed Nov. 28, 1927        3 Sheets-Sheet 3
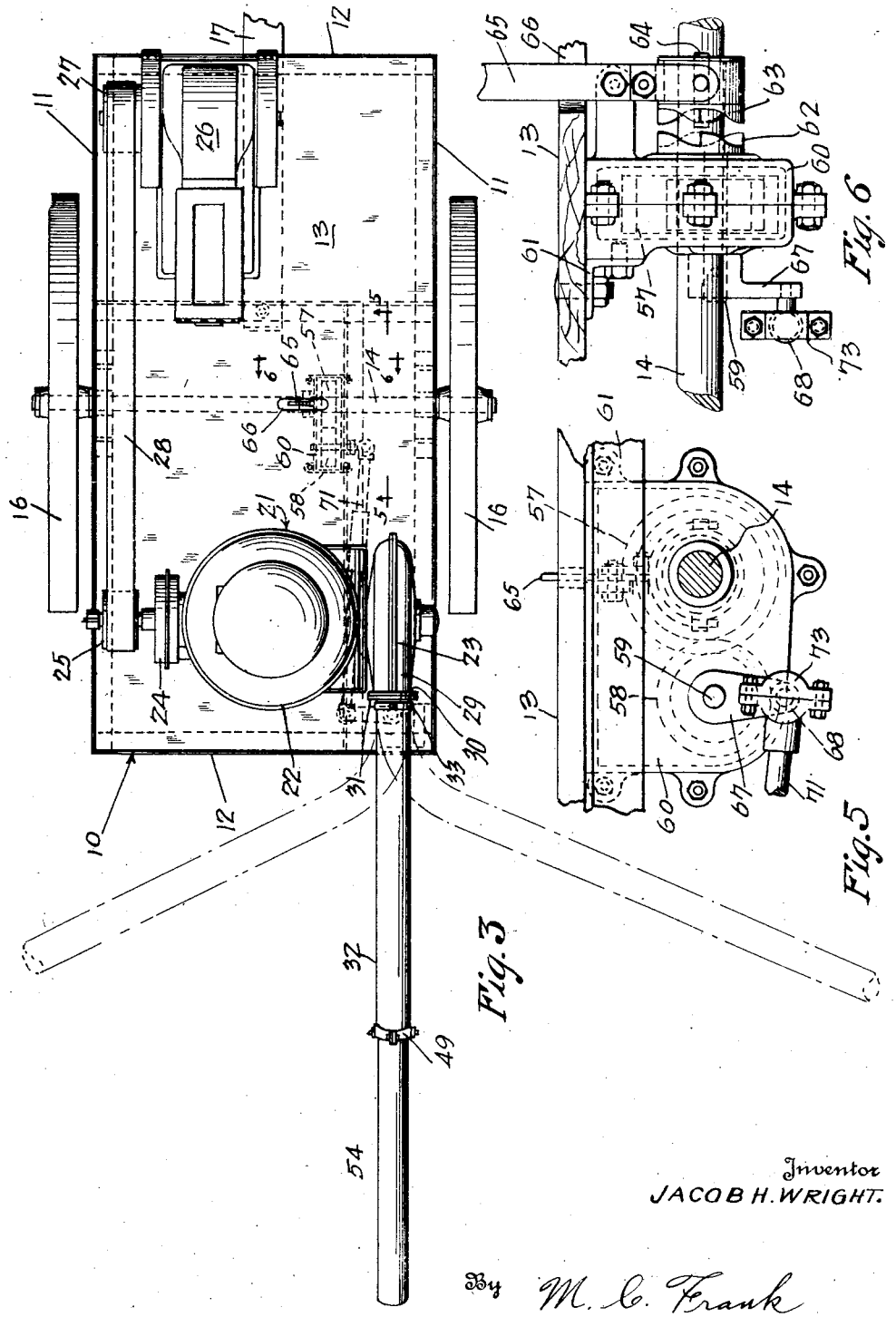
Inventor
JACOB H. WRIGHT.
By M. C. Frank
Attorney Patented Aug. 20, 1929.

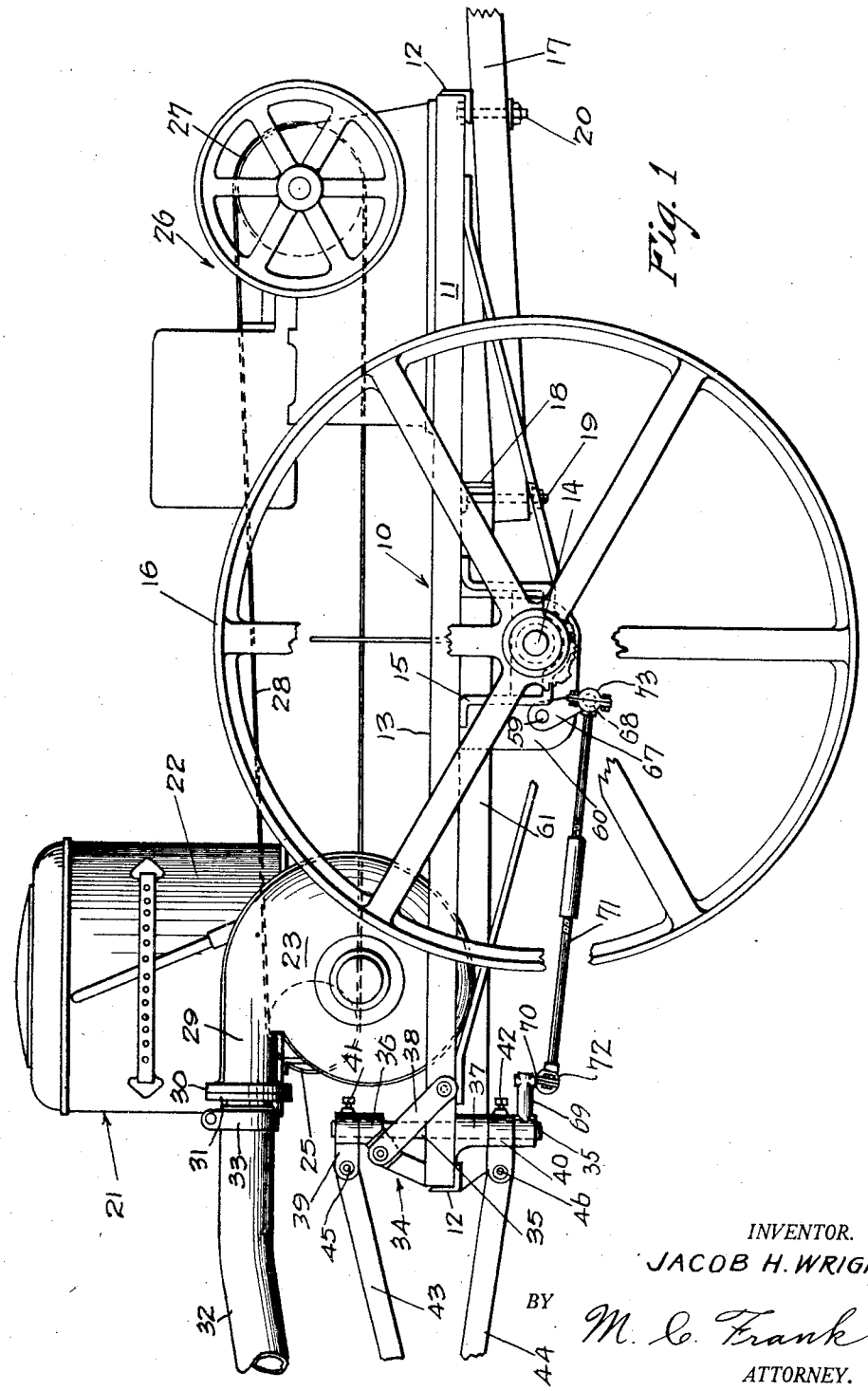

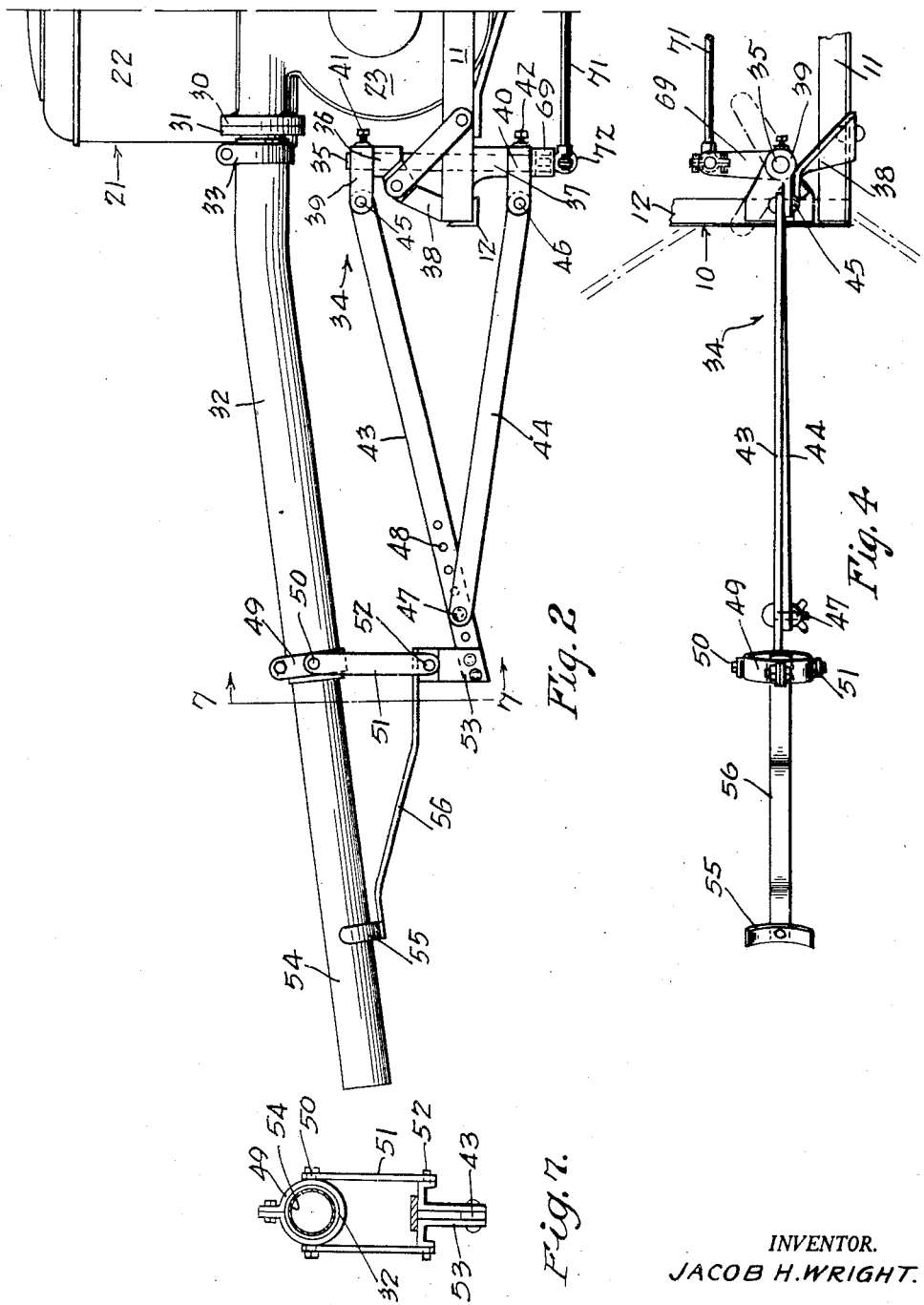

1,724,986

UNITED STATES PATENT OFFICE.

JACOB H. WRIGHT, OF OAKLAND, CALIFORNIA, ASSIGNOR TO WESTERN SULPHUR COMPANY, INC., OF SAN FRANCISCO, CALIFORNIA, A CORPORATION OF CALIFORNIA.

PORTABLE PLANT-DUSTING MACHINE.

Application filed November 28, 1927. Serial No. 236,093.

This invention relates broadly to improvements in agricultural machinery and in particular to portable plant-dusting machines for the purpose of applying insecticides, such as sulphur, to growing plants to accomplish the destruction of injurious insects and fungi common thereto.

The primary object of the present invention is the provision of a trailer adapted to be drawn or moved between rows of plants and upon which is mounted an insecticide dusting unit having an oscillating discharge pipe arranged to be oscillated between the rows, to thoroughly dust the insecticide upon the plants of both rows simultaneously as the machine moves over the ground.

Another object of the invention is the provision of a machine of the character designated which carries its own power plant for causing the functioning of the dusting unit, and which combines clutch means for disconnecting the dusting unit therefrom when desired.

Another object of the invention is the provision in an apparatus of the class designated positive means for oscillating the insecticide discharge pipe thereof, said means being preferably actuated by the tractive movement of the trailer wheels over the ground.

Still another object of the invention is the provision of novel means for swivelly supporting the discharge pipe of the machine so that it may be free to oscillate in a horizontal plane to thoroughly dust the plants from side to side as the apparatus progresses.

Additional to the foregoing objects, is the provision of a portable apparatus of the class indicated which is positive in operation, durable, is characterized by greater simplicity and compactness of structure, and is comparatively cheap to manufacture.

Other and ancillary objects of my invention will be suggested in the following description and in the uses to which my invention is put. Certain of the objects of my invention may be attained with the use of less than all its preferred features. It is desired that my invention be limited only by the claims constituting its final determination.

Referring to the drawings forming part of this specification:

Figure 1 is a side elevation showing the preferred embodiment of my invention and which, in this instance, is a two-wheeled trailer having a tongue adapted for attachment to any traction means and is provided at its rear end with the insecticide dusting unit;

Figure 2 is a continuation of the rear end of Figure 1 and illustrates the discharge pipe and its mounting, the said pipe being of flexible character and having means associated therewith to cause it to flex relative to the blower by a horizontal oscillating movement thereof as the machine progresses;

Figure 3 is a top plan of the apparatus showing the various elements constituting the device, the dot and dash lines indicating the limiting positions of the oscillatory discharge pipe;

Figure 4 is a top plan of a portion of the mechanism for supporting and oscillating the discharge pipe;

Figure 5 is an enlarged sectional detail of the gear means for oscillating the discharge pipe, such means being mounted upon the axle of the trailer and adapted to receive rotary motion from the trailer wheels; the section is indicated by the line 5—5 in Figure 3;

Figure 6 is an end view of Figure 5 and as seen looking from the front end of the vehicle and shows to advantage the gear clutch mechanism; the view being indicated by the line 6—6 in Figure 3; and Figure 7 is a sectional detail of the swivelled yoke member for supporting the outer end of the flexible discharge pipe, the section being indicated by the line 7—7 in Figure 2.

Referring to the drawings in detail in which the preferred embodiment of my invention is shown, the numeral 10 designates a rectangular frame which preferably consists of angle bar longitudinals 11, transverse bars 12, and a wood platform 13.

The frame 10 carries a transversely disposed axle 14, which is mounted in suitable bearings carried by U-shaped supports 15, which supports are mounted on the underside of the frame. A pair of suitable wheels 16 are disposed upon opposite sides of the frame and are keyed, or otherwise secured, to the axle 14 so that the latter will rotate with the wheels.

A draft bar or tongue 17 is disposed centrally of the platform 13, and is secured at its inner end to a transverse bar 18 by a bolt 19 and intermediate its ends by a bolt 20 to the underside of the angle bar 12.

The insecticide dusting unit 21 is mounted upon the rear end of the platform and is secured thereto in any suitable manner. The unit consists of an insecticide container 22, blower 23, driving means 24, and clutch pulley 25, as fully disclosed and described in my co-pending application, Serial No. 196,707. The details of this unit form no part of the subject matter of the present application, and therefore, it is not thought necessary to enter into a detailed description thereof in this case.

A prime mover 26 is mounted upon the platform 13 near the forward end thereof, and consists of any suitable type of power plant to drive the dusting unit 21; said plant having a driving pulley 27 which is aligned with the pulley 25 of the dusting unit, the two pulleys being connected by a suitable driving belt 28.

The blower casting 29 is provided with a flanged discharge neck 30, against which is bolted a flanged coupling member 31, which latter has telescoped thereon the inner end of a flexible pipe connection 32 that is preferably clamped to the coupling 31 by means of a hose clamp 33. The pipe 32 extends rearwardly of the machine and is designed to effect a horizontal swinging movement relative to the apparatus, as hereinafter described.

The mechanism 34 supports the inner end of the flexible connection 32 and also causes the oscillation of the pipe. The said mechanism consists of a vertically disposed shaft 35 mounted to one corner of the frame directly below the inner end of the connection 32, and is carried by bearings 36 and 37 which are secured to the frame side-piece 11 and end-piece 12 by means of braces 38. The upper and lower ends of the shaft 35 are provided with members 39 and 40, which members are held rigid to the shaft by set screws 41 and 42 but are adapted to rotate in a horizontal plane as will be presently set forth.

A pair of links 43 and 44 are supported at their inner ends by pivot pins 45 and 46 on the members 39 and 40 respectively, and are connected together at their outer ends by a bolt 47, as clearly shown in Figure 2. The link 43 has a plurality of bolt holes 48 adjacent its outer end to provide means for adjusting the inclination of the connection 32 relative to the ground level.

The outer end of the flexible pipe connection 32 is carried by a clamp member 49 which is provided with horizontally disposed lugs 50, upon which are mounted link connections 51; the lower ends of said links being in turn pivotally connected at 52 to a rigid upright bracket 53 suitably carried by the outer end of the link 43. The clamp 49 and links 51 form a yoke adapted to compensate for the varying positions assumed by the discharge pipe. A short section 54 of sheet-metal pipe is telescoped into the end of the connection 32 and is clamped therein by the clamp 49, said section 54 being supported intermediate its ends by means of a saddle 55 carried by a spring member 56, the inner end of which member is integral with the bracket 53.

The means for oscillating the discharge pipe 32 consists of a driving gear 57 which is loosely mounted upon the axle 14 and a meshing pinion 58, which pinion is mounted upon a shaft 59 mounted in a suitable gear box 60. The gear box encloses both said gear and pinion and is in turn bolted to an angle bar 61 carried by the frame 10 of the trailer. In Figure 6 it will be observed that the inside face of the gear 57 carries a clutch collar 62, and that a second clutch collar 63 is splined to the axle 14 by a key 64, the collar 63 being movable into and out of engagement with the collar 62 by means of a manually movable shift lever 65 which projects upwardly through a slot 66 formed in the platform 13, by means of which lever the mechanism 34 may be disengaged to stop the oscillation of the discharge pipe.

The shaft 59 is rigidly provided with a short arm 67 having an integral ball 68 projecting horizontally from the outer end thereof, and the vertically disposed shaft 35 is provided with a horizontally disposed integral arm 69 having a downwardly disposed ball member 70, the said arms 67 and 69 being connected together by an adjustable rod 71 having sockets 72 and 73 adapted to receive the ball members 70 and 68, respectively, of said arms 67 and 69.

It will now be noted that when the trailer is being drawn in a forwardly direction and the clutch collars are in engagement, the rotary motion of the axle 14 is transmitted to the gears 57 and 58, and the gear 58 in turn rotates the shaft 59 and arm 67, which latter causes the reciprocation of the rod 71 and the oscillation of the arm 69, such oscillating movement being transmitted through links 43, 44 and 51, and clamp 49 to the discharge pipe, which pipe by reason of being flexible between the clamps 49 and 33, flexes therebetween and consequently is oscillative to-and-fro in a horizontal plane, as shown in dot and dash lines in Figure 3.

The above described oscillative movement of the discharge pipe 32 causes the insecticide, which is sucked from the container by the blower 23, to be discharged from the end of the pipe 54 in a fan-shaped cloud, thus thoroughly and simultaneously dusting the adjacent rows of plants on either side of the machine with the insecticide and also covering the space between the rows as the machine progresses over the ground.

It is obvious that a machine of the character described combined with my invention and constructed in accordance therewith, will be much more effective and efficient than an apparatus which merely discharges the insecticide rearwardly or to one side, thus an operator may cover a great deal more ground in a more thorough manner and in a minimum period of time than would be possible under ordinary conditions.

I claim:

1. In a portable plant-dusting machine, in combination, a trailer frame having an axle and at least two wheels, a power unit and a dusting unit fixedly mounted upon said frame, a driving connection between said power unit and dusting unit, a flexible discharge pipe associated with said dusting unit and mounted for oscillation relative thereto, and means associated with the trailer axle for oscillating said discharge pipe.

2. In a device of the class described, a dusting unit consisting of an insecticide container and a fan blower mounted upon a trailer having a frame and axle, a flexible discharge pipe connected to said fan blower and adapted for flexing movement relative thereto, a combined supporting and oscillating mechanism mounted upon the trailer frame and cooperating with said discharge pipe to support the same for such oscillating movement, a yoke carried by said supporting and oscillating mechanism and swivelly positioned between the ends of said discharge pipe to compensate for variations due to the flexing movements of said pipe, and means cooperating with the trailer axle to cause the actuation of said oscillating mechanism.

3. In a device of the class described, a dusting unit having a fan blower cooperatively associated therewith, a flexible discharge pipe connected with the discharge end of said fan blower and adapted to flex relative thereto, mechanism associated with said pipe to cause a continued oscillating movement thereof in a plane to discharge the dust as received from said unit in a fan-shaped cloud, and means for adjustably varying the angle of oscillation of the pipe.

4. In a device of the character described, a vehicle, a dusting unit mounted on said vehicle and including a blower fixedly disposed on the vehicle, a flexible discharge pipe for said blower, a combined supporting and oscillating mechanism extending from the vehicle to support said pipe for oscillating movement thereof, means providing a swivelled connection between the pipe and said mechanism, and means for automatically actuating said mechanism in accordance with the movement of the vehicle.

5. In combination with a vehicle carrying a dusting unit, a flexible dust discharge pipe having an end fixed relative to the vehicle, means providing a bracket supporting said pipe for oscillation about a fixed end thereof, and means cooperating with said bracket to automatically effect the oscillation of said pipe in accordance with the rate of movement of the vehicle.

6. In combination with a wheeled vehicle, a dusting unit mounted on said vehicle, a flexible discharge pipe for said unit having its inner end fixed with respect to the vehicle, a bracket mounted on said vehicle for oscillation in an horizontal plane, means for varying the level of movement of an outer bracket portion with respect to said inner pipe end, link means connecting said pipe and outer bracket portion whereby a link movement is permitted in a vertical plane including said bracket, means operatively connecting said bracket to a vehicle wheel to automatically effect the oscillation of said pipe in accordance with the rate of movement of the vehicle, and means for adjustably varying the angle of oscillation of the bracket.

In testimony whereof, I affix my signature.

JACOB H. WRIGHT.